(12) United States Patent
Tuomela et al.

(10) Patent No.: US 8,316,697 B1
(45) Date of Patent: Nov. 27, 2012

(54) FIXTURE TO HERMETICALLY ISOLATE A CAPPED OPENING ON A CONTAINER FOR GAS TRANSMISSION TESTING

(75) Inventors: Stephen Tuomela, Ramsey, MN (US); Slava Berezovskiy, Apple Valley, MN (US)

(73) Assignee: Mocon, Inc., Minneapolis, MN (US)

( * ) Notice: Subject to any disclaimer, the term of this patent is extended or adjusted under 35 U.S.C. 154(b) by 431 days.

(21) Appl. No.: 12/762,831

(22) Filed: Apr. 19, 2010

(51) Int. Cl.
*G01M 3/04* (2006.01)
*G01M 3/08* (2006.01)
*G01N 15/08* (2006.01)

(52) U.S. Cl. .................. 73/49.2; 73/46; 73/38
(58) Field of Classification Search ......... 73/38, 40, 73/46, 49.2, 866.5
See application file for complete search history.

(56) References Cited

U.S. PATENT DOCUMENTS

| | | | |
|---|---|---|---|
| 4,292,839 A * | 10/1981 | Hartness | 73/49.2 |
| 4,852,415 A | 8/1989 | Bogatzki et al. | |
| 5,319,957 A | 6/1994 | Stieger et al. | |
| 5,591,899 A | 1/1997 | Griensbeck | |
| 6,018,987 A * | 2/2000 | Mayer et al. | 73/49.2 |
| 6,347,545 B1 * | 2/2002 | Osborn et al. | 73/49.2 |
| 6,964,191 B1 | 11/2005 | Tata | |
| 7,624,622 B1 | 12/2009 | Mayer et al. | |

* cited by examiner

*Primary Examiner* — Hezron E Williams
*Assistant Examiner* — Nathaniel Kolb
(74) *Attorney, Agent, or Firm* — Sehrrill Lae Offices, PLLC (57) ABSTRACT

An analytical instrument and associated method for ascertaining gas transmission rates of a target-analyte through a capped mouth of a bottle. The instrument employs a unique fixture that includes (1) a selectively openable and closeable enclosure defining a chamber, and (2) a mounting post extending into the chamber. The post is configured and arranged to sealingly engage an inner surface of a capped bottle neck, wherein mounting of a capped bottle neck onto the post sealingly separates the chamber into a first compartment inside the mounted capped bottle neck and a second compartment outside the mounted capped bottle neck. The fixture is configured and arranged with passageways for introducing a pressurized target-analyte-containing fluid into the first compartment of the chamber and flushing the second compartment of the chamber with a target-analyte-free fluid.

27 Claims, 8 Drawing Sheets

Fig. 8

FIXTURE TO HERMETICALLY ISOLATE A CAPPED OPENING ON A CONTAINER FOR GAS TRANSMISSION TESTING

BACKGROUND

Carbonated beverages are ubiquitous in modern society. As the name indicates, such beverages are infused with carbon dioxide and maintained under pressure. Loss of carbonation causes a carbonated beverage to become stale or "flat". Bottlers of carbonated beverages desire to know the rate of carbonation loss for its various bottled products as such information allows the bottler to determine the shelf-life of its products and test various bottle types and designs for their ability to retain carbonation.

Carbonated beverage bottles typically include a body portion, a neck portion that is narrower than the body, and a mouth atop the neck. The mouth of the bottle is closed with a twist-off or pry-off cap or closure after the bottle has been filled.

Carbonated beverages tend to lose carbonation through both the walls of the bottle body and neck, and through the cap or closure area of the bottle. Loss of carbonation through the bottle walls occurs by permeation of carbon dioxide through the walls. Loss of carbonation through the cap or closure area tends to occur by both permeation of carbon dioxide through the cap and leakage of carbon dioxide through the seal formed between the cap and the bottle.

Testing equipment has been developed for measuring a total rate of carbonation loss from a bottle, such as described in U.S. Pat. Nos. 6,964,191 and 7,624,622, and for ascertaining the rate of carbonation loss from permeation through the cap or closure area as a component of total carbonation loss from a bottle, such as described in U.S. Pat. No. 6,018,987. However, none of the testing equipment developed to date is capable of providing an accurate measurement of the effectiveness of a cap or closure to prevent loss of carbonation as the testing equipment measures the rate of carbonation loss through the cap or closure area while allowing a contemporaneous unmeasured lose of carbonation through the sidewalls of the bottle. By allowing a contemporaneous loss of carbonation through the bottle sidewall, a second variable is introduced (e.g., $\Delta P$ and $\Delta P_{CO_2}$ across the bottle may vary from test to test), preventing the test data from serving as a true and accurate indication of transmission of carbon dioxide through the cap or closure area, and destroys the ability to directly compare test results.

Accordingly, a substantial need exists for testing equipment capable of accurately and reliably measuring the carbon dioxide transmission rate through the cap or closure area of a carbonated beverage bottle.

SUMMARY OF THE INVENTION

A first aspect of the invention is a fixture for use in testing gas transmission rates through a capped mouth of a bottle. The fixture includes (1) a selectively openable and closeable enclosure defining a chamber, (2) a mounting post extending into the chamber, and (3) a passageway through the post for introducing a pressurized fluid into the chamber. The post is configured and arranged to sealingly engage an inner surface of a capped bottle neck, wherein mounting of a capped bottle neck onto the post sealingly separates the chamber into a first compartment inside the mounted capped bottle neck and a second compartment outside the mounted capped bottle neck. The passageway is configured and arranged for introducing pressurized fluid into the first compartment of the chamber.

A second aspect of the invention is an analytical instrument for measuring gas transmission rate of a target-analyte through a capped mouth of a bottle. The instrument includes (i) a fixture in accordance with the first aspect of the invention, (ii) a source of pressurized gas containing a target-analyte in fluid communication with the first compartment via the passage through the post, and (iii) a target-analyte sensor in communication with the second compartment for detecting target-analyte in the second compartment.

A third aspect of the invention is a method of measuring gas transmission rate of a target-analyte through a capped mouth of a bottle. The method includes the steps of (A) obtaining an instrument in accordance with the second aspect of the invention, (B) obtaining a capped neck portion of a bottle, (C) mounting the capped bottle neck onto the post so as to form the first compartment, (D) closing the enclosure so as to seal the entire mounted capped bottle neck within the chamber and form the second compartment, (E) flushing the second compartment to remove target-anlayte from the second compartment, (F) introducing pressurized gas containing target-analyte into the first compartment via the passage through the post, and (G) detecting and measuring target-analyte passing from the first compartment into the second compartment through the mounted capped bottle neck.

The capped neck portion of a bottle can be obtained by severing the neck portion of a bottle from a majority of the body portion of the bottle. Enhanced accuracy is achieved by testing a capped bottle neck rather than the cap alone as testing of the cap alone (i.e., mounting just the cap sans the entire bottle onto a mounting post) ignores "leakage" through the seal between the cap and the bottle.

DETAILED DESCRIPTION OF A PREFERRED EMBODIMENT

Definitions

As used herein, including the claims, the phrases "flushing gas" and "target-analyte free gas" mean a gas having less than 0.1%, preferably less than 0.01% target-analyte.

As used herein, including the claims, the phrase "target analyte" means a molecule whose presence-absence within the second compartment is detected and measured. Typical target-analytes are oxygen $O_2$ and carbon dioxide $CO_2$.

As used herein, including the claims, the phrase "essentially 100%" means containing only trace amounts of contaminants.

Nomenclature
10 Analytical Instrument
110 Source of Pressurized Target-Analyte-Containing Test Gas
111 Control Valve for Test Gas
112 Test Gas Supply Line from Source of Test Gas to Fixture
113 Venting Valve for Test Gas
120 Source of Pressurized Target-Analyte-Free Carrier Gas
121 Control Valve for Carrier Gas
122a Carrier Gas Supply Line from Source of Carrier Gas to Fixture
122b Carrier Gas Exhaust Line from Fixture to Sensor
123 Venting Valve for Carrier Gas
130 Source of Target-Analyte-Free Flushing Gas
131 Control Valve for Flushing Gas
132 Flushing Gas Supply Line from Source of Flushing Gas to Fixture
133 Venting Valve for Flushing Gas
200 Fixture or Enclosure
209 Chamber
$209^1$ First Compartment of Chamber
$209^2$ Second Compartment of Chamber
210 Tray
211 Mounting Post
211d Distal End of Mounting Post
212a First Stanchion
212b Second Stanchion
215 Annular Channel on Exterior of Mounting Post
216 First or Test Gas Passageway
216i Test Gas Inlet
216o Test Gas Outlet
216v Test Gas Vents
217 Second or Carrier Gas Passageway
217i Carrier Gas Inlet
217o Carrier Gas Outlet
218 Third or Flushing Gas Passageway
218i Flushing Gas Inlet
218o Flushing Gas Outlet
219 Well in Tray
220 Cover
221 Ring Fitting on Cover
228 Dimple in Top of Cover
229 Cavity Defined by Cover
231 Chamber O-Ring
232 Vent O-Ring
233 Proximal O-Ring on Post
234 Distal O-Ring on Post
240 Compression Beam
249 Threaded Orifice Through Compression Beam
250 Knob
251 Handle
252 Shaft
252t Tip of Shaft
260 Slide Clips
269 Slot in Slide Clips
270 Machine Screw
300 Target-Analyte Sensor
B Bottle
C Bottle Cap
F Annular Flange on Bottle Neck
M Mouth
N Bottle Neck
$N_i$ Inner Surface of Bottle Neck
Z Capped Bottle Neck

DESCRIPTION

Construction

Figure 1:
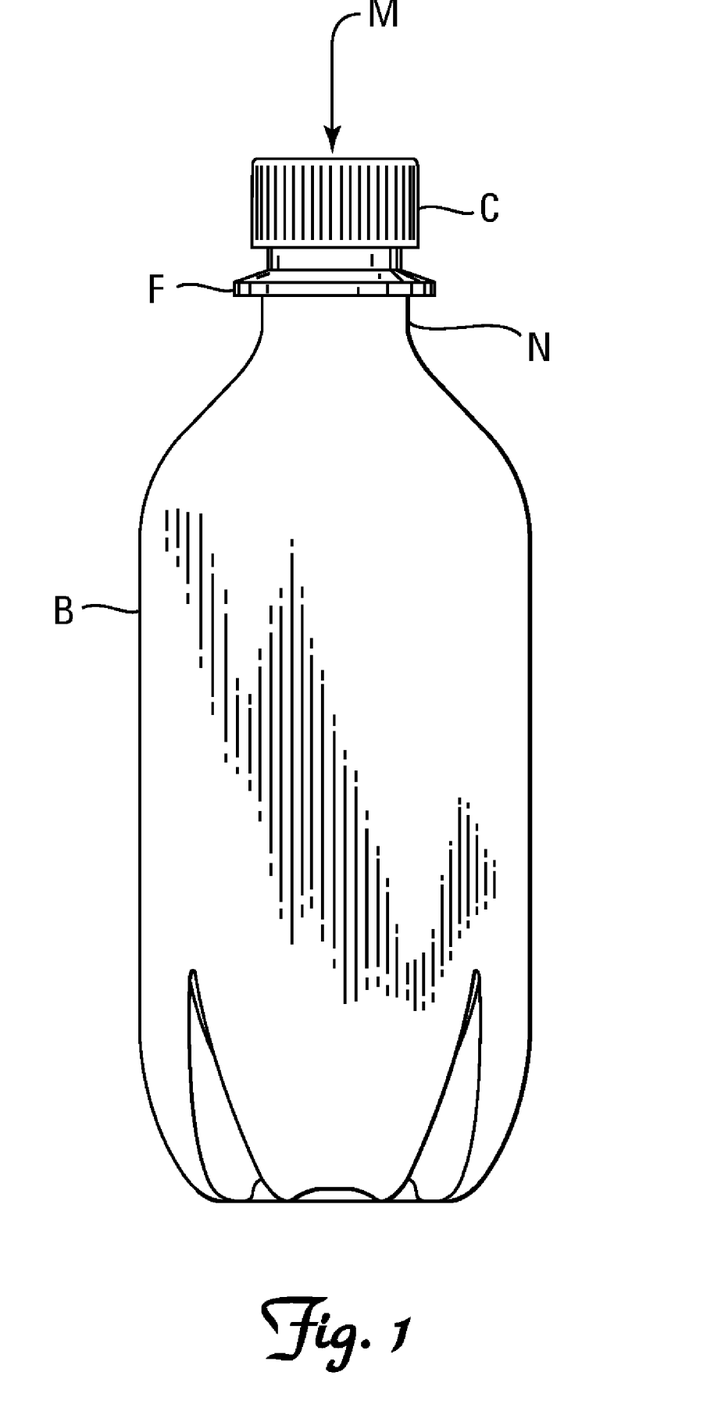
FIG. 1 is a side view of a standard plastic carbonated beverage bottle.
Figure 2:
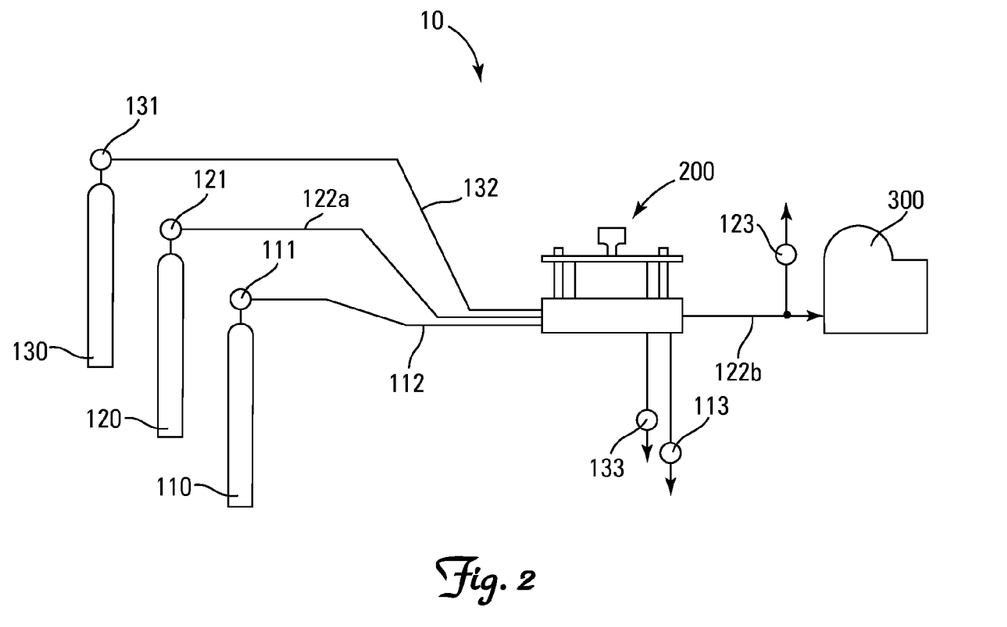
FIG. 2 is a schematic flow-diagram of one embodiment of the invention.

Referring generally to FIGS. 1 and 2, the invention is directed to an analytical instrument 10 with a unique mounting fixture 200 effective for accurately measuring gas transmission rate of a target-analyte through the capped mouth M of a bottle B.

Figure 5:
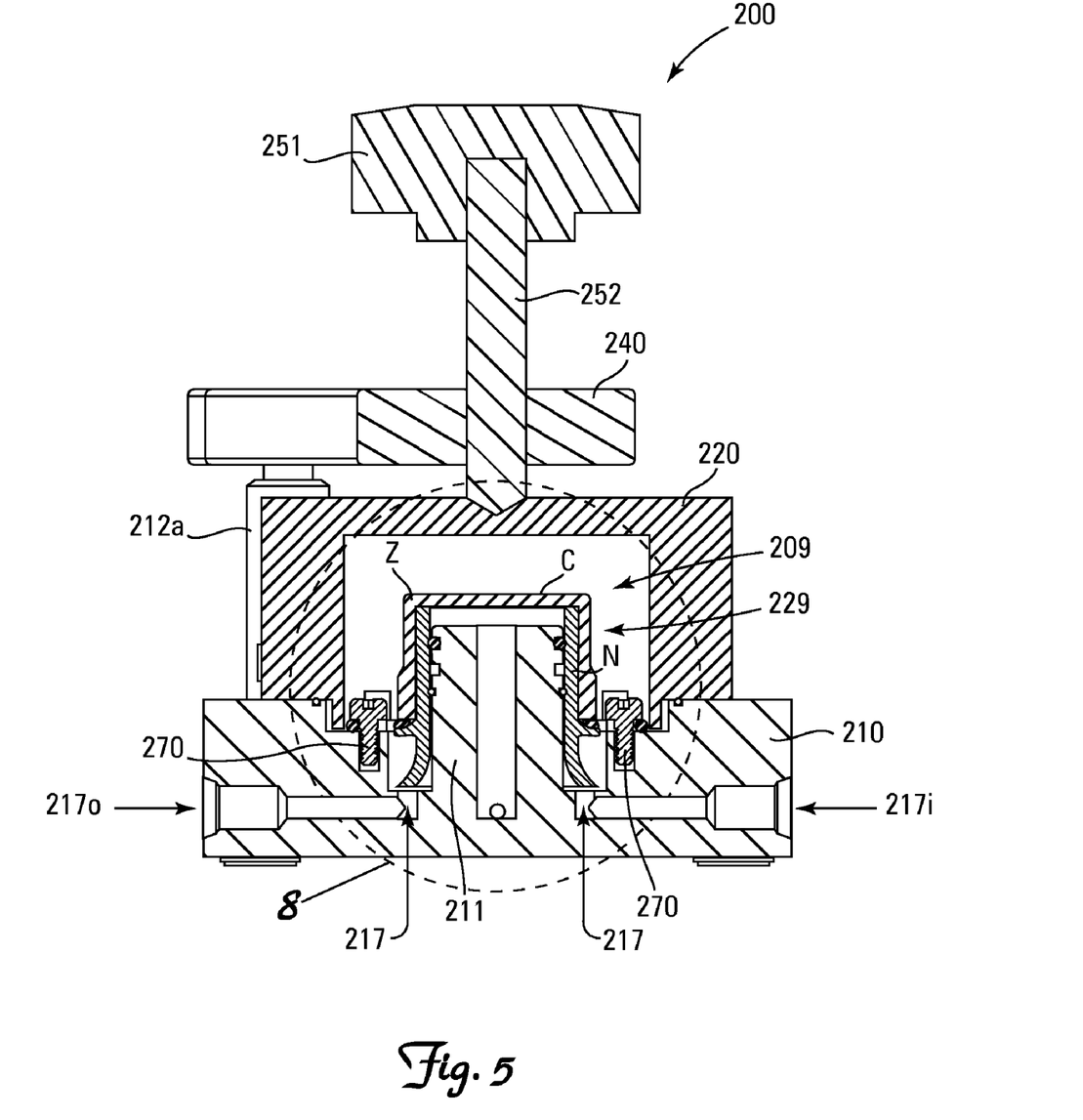
FIG. 5 is a cross-sectional side view of the fixture depicted in FIG. 3 taken along line 5-5 with a capped bottle neck clamped onto the mounting post.
Figure 6:
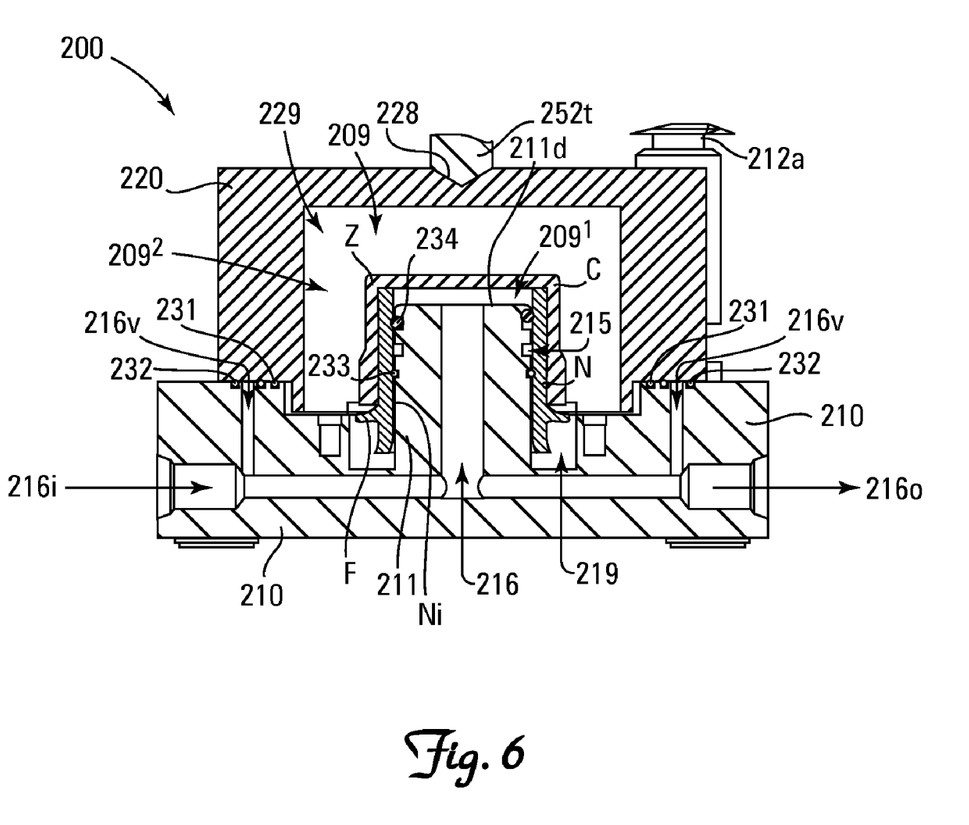
FIG. 6 is a cross-sectional side view of the fixture depicted in FIG. 3 taken along line 6-6 with a capped bottle neck clamped onto the mounting post.

Referring to FIGS. 5 and 6, the fixture 200 has a base or tray 210 that defines a well 219, and a cover 220 that defines a cavity 229. The well 219 and cavity 229 form a test chamber 209 when the cover 220 is secured atop the tray 210.

Referring to FIGS. 5, 6, 7 and 8, a mounting post 211 extends upward from the well 219. The mounting post 211 is configured and arranged to fit within and be crowned by a capped bottle neck Z so as to form a first compartment $209^1$ within the capped bottle neck Z between the distal end 211d of the mounting post 211 and the cap C on the capped bottle neck Z. A pair of axially spaced o-rings 233 and 234 are provided on the mounting post 211 for sealingly engaging the inner surface $N_i$ of the bottle neck N on the capped bottle neck Z. The o-rings 233 and 234 seal the first compartment $209^1$ off from the surrounding environment.

Referring to FIG. 6, the tray 210 includes a passageway 216 through which test gas—containing a known concentration of target-analyte—can be introduced into the first compartment $209^1$ from a pressurized source of the test gas 110 during testing.

Figure 7:
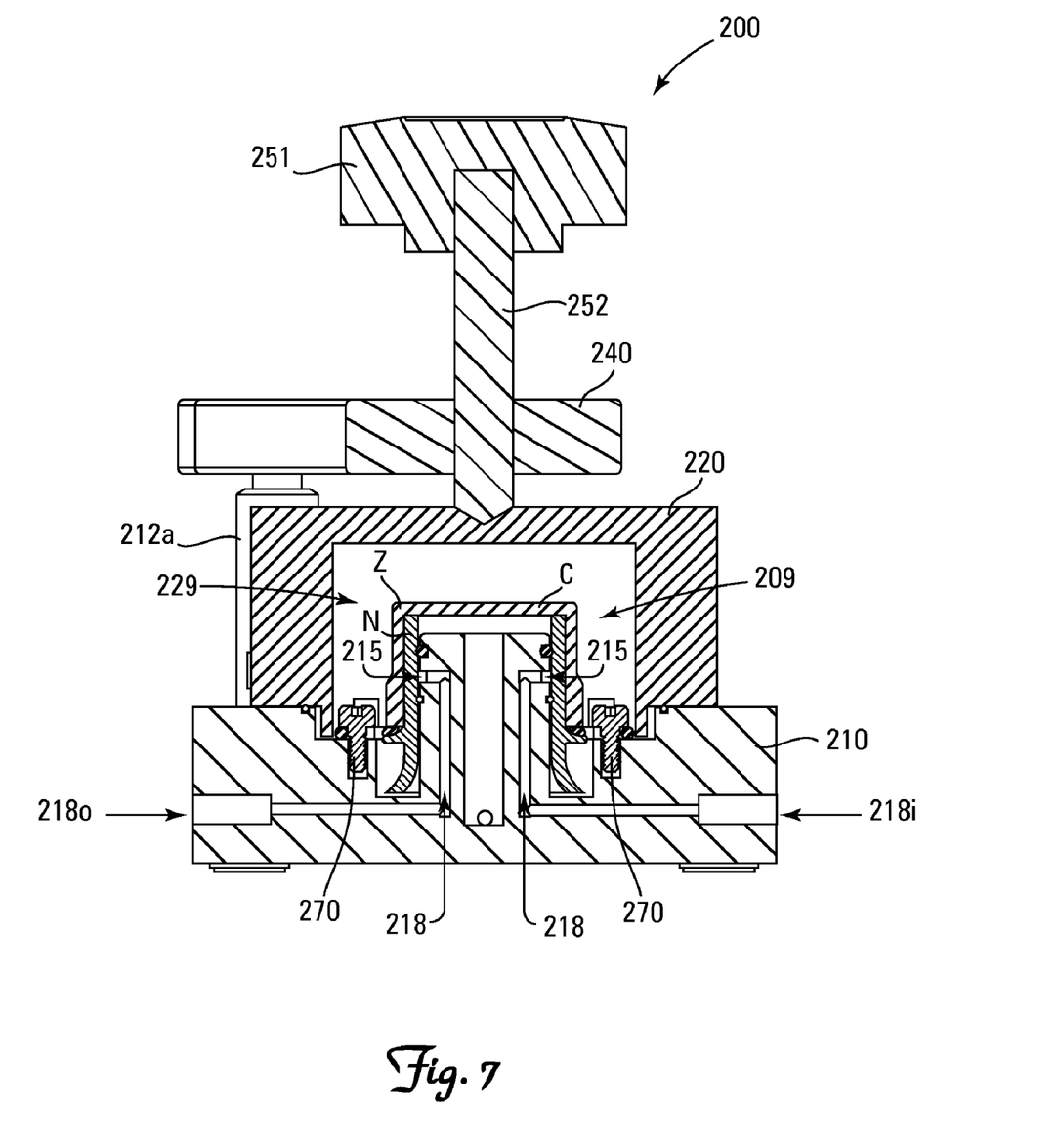
FIG. 7 is a cross-sectional side view of the fixture depicted in FIG. 3 taken along line 7-7 with a capped bottle neck clamped onto the mounting post.
Figure 8:
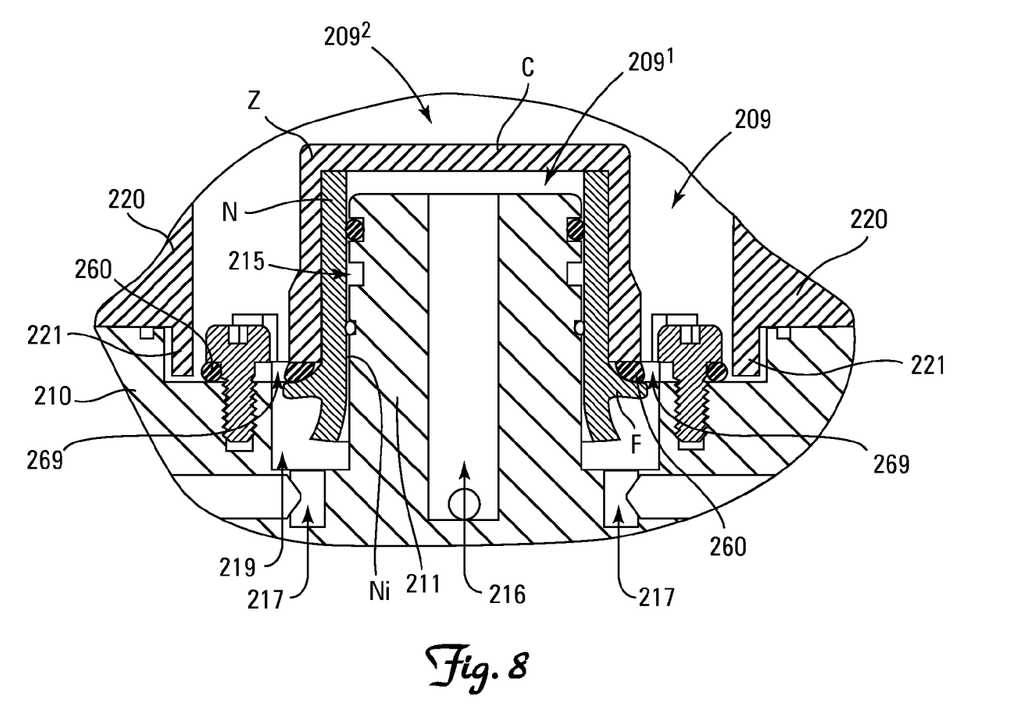
FIG. 8 is an enlarged cross-sectional side view of the mounting post and mounted capped bottle neck depicted in FIG. 5.

Referring to FIG. 7, an annular channel 215 is preferably provided on the exterior surface (unnumbered) of the mounting post 211 intermediate the upper o-ring 233 and the lower o-ring 234 on the mounting post 211 for capturing and venting any test gas that may leak from the first compartment $209^1$ through the upper o-ring 233. The annular channel 215 is preferably in fluid communication with a source of target-analyte-free gas 130 for flushing the annular channel 215 during testing.

Referring to FIG. 6, the cover 220 is configured and arranged to cooperatively engage the tray 210 so as to form a test chamber 209 that sealingly surrounds the mounting post 211, whereby mounting of a capped bottle neck Z onto the mounting post 211 divides the test chamber 209 into the previously described first sealed compartment $209^1$ within the capped bottle neck Z and a second sealed compartment $209^2$ surrounding the capped bottle neck Z. An o-ring 231 encircling the test chamber 209 is provided between the interface of the tray 210 and the cover 220 for sealing the test chamber 209 from the surrounding environment.

Figure 3:
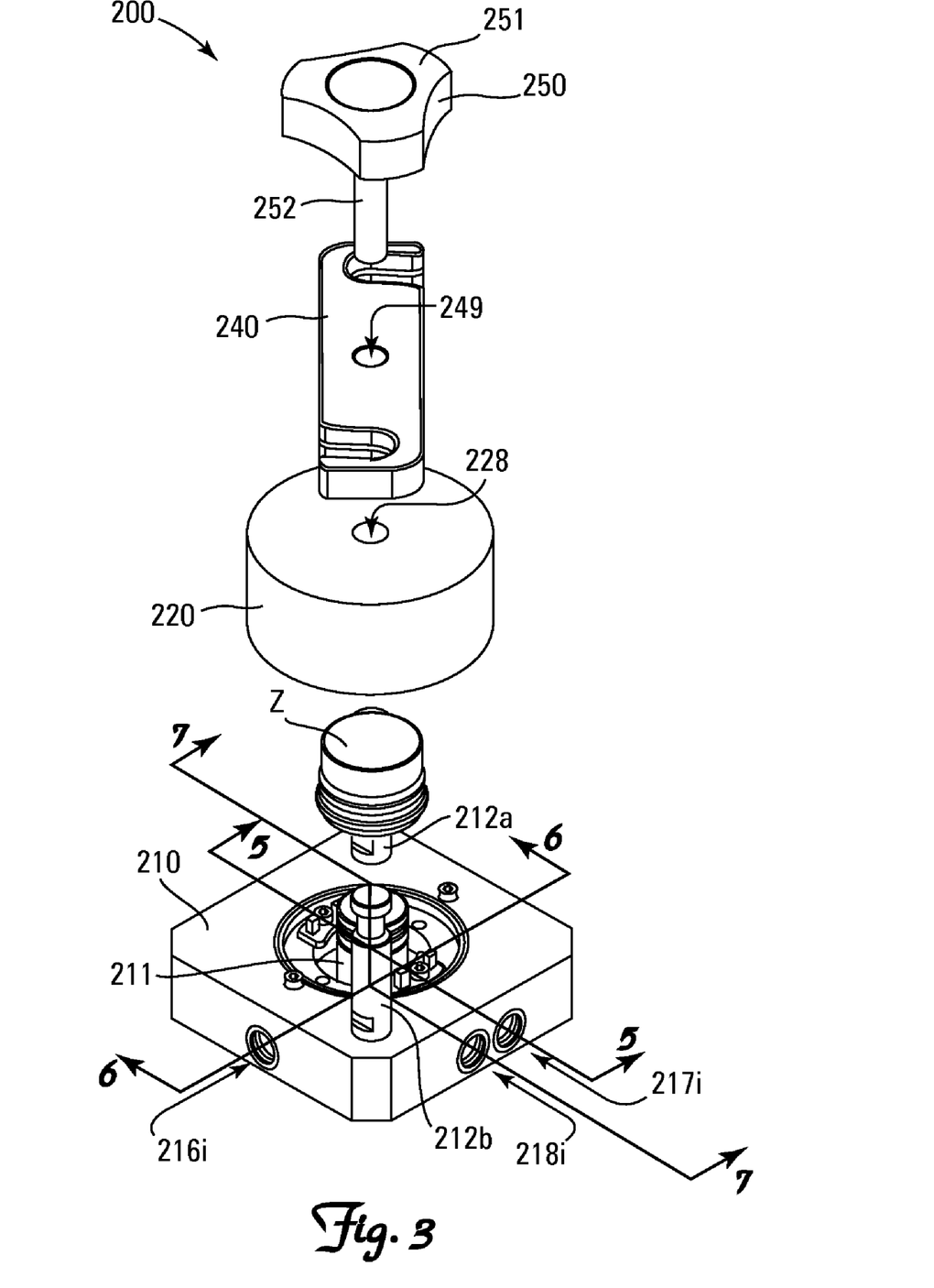
FIG. 3 is an exploded perspective view of one embodiment of the fixture depicted in FIG. 2 with a capped bottle neck severed from the bottle body.

Referring to FIGS. 3 and 5, the cover 220 may be secured to the tray 210 by any number of suitable attachment mechanisms or systems known to those of routine skill in the art. One such mechanism, depicted in FIGS. 3 and 5, includes a pair of mushroom head stanchions 212a and 212b that extend upward from diametric corners of the tray 210, a beam 240 for selectively engaging the stanchions 212a and 212b below the mushroom head on each stanchion 212a and 212b such that the beam 240 can slide along the length of the stanchions 212a and 212b but is trapped below the mushroom heads on the stanchions 212a and 212b, and a knob 250 with a handle 251 and a shaft 252 for threadably engaging and extend through an orifice 249 in the beam 240 and pressing against the top of the cover 220. Referring to FIG. 6, the tip 252t of the shaft 252 on the knob 250 is preferably captured by a dimple 228 in the top of the cover 220 so that the shaft 252 does not slide across the top of the cover 220 as the knob 250 is rotated relative to the joist 240 to press the cover 220 down onto the tray 210.

Figure 4A:
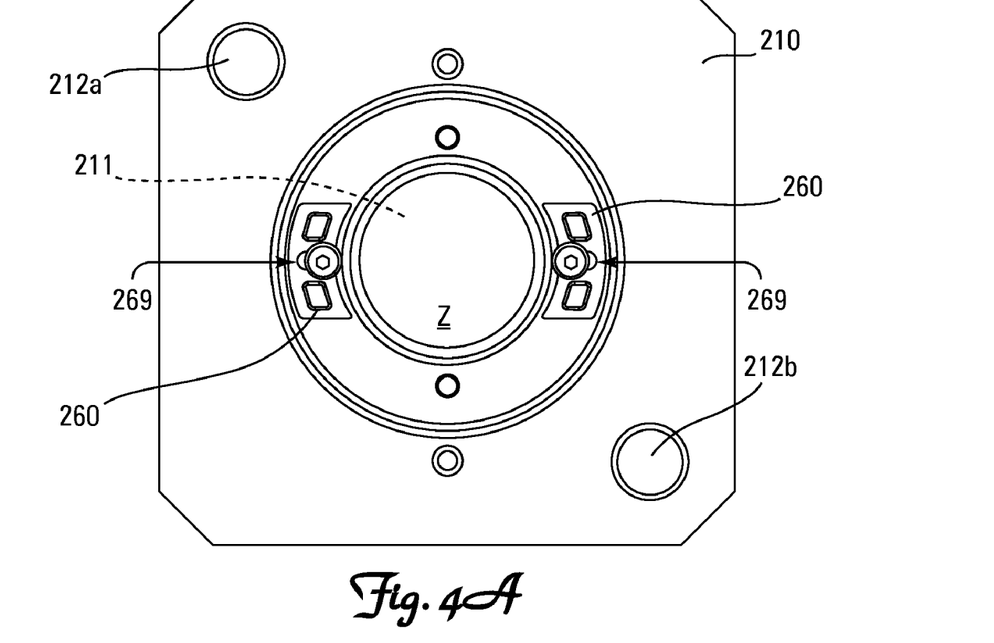
FIG. 4a is a top view of the tray component of the fixture depicted in FIG. 3 with the clips slid outward for allowing mounting and release of a capped bottle neck on the mounting post.
Figure 4B:
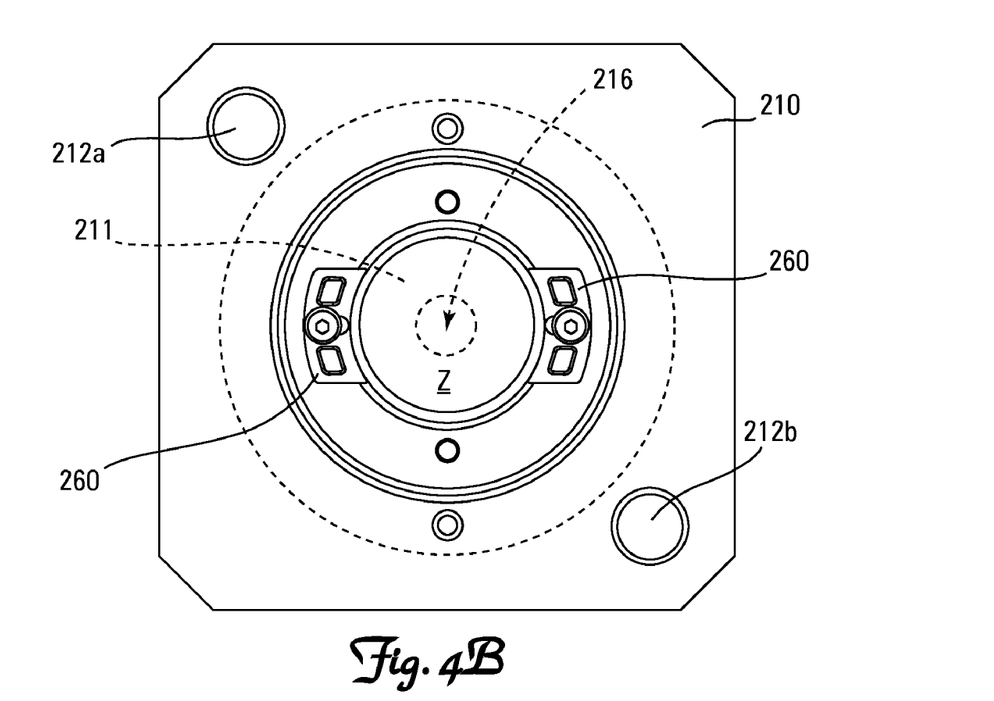
FIG. 4b is a top view of the tray component of the fixture depicted in FIG. 3 with the clips positioned inward for clamping a capped bottle neck onto the mounting post.

Carbonated beverages are typically bottled at a pressure of between 4 and 6 atmospheres. Hence, in order to accurately emulate real-world conditions, the first compartment $209^1$ should be pressurized to approximately 4-6 atmospheres with test gas when testing capped bottle necks Z from bottles B intended for use with carbonated beverages. Accordingly, the fixture 200 preferably includes a mechanism for clamping a capped bottle neck Z down onto the mounting post 211 in order to prevent the mounted capped bottle neck from being "shot" off the mounting post 211 during testing by the pressure within the first compartment $209^1$. A capped bottle neck Z may be secured to the mounting post 211 by any number of suitable attachment mechanisms or systems known to those of routine skill in the art. One such mechanism, depicted in FIGS. 4a, 4b and 8, includes a pair of clips 260 slidably secured to the tray 210 on opposite sides of the mounting post 211 by a machine screw 270 extending through a slot 269 in the clip 260. The clips 260 can be selectively moved away from one another for allowing mounting and release of a capped bottle neck Z on the mounting post 211 as depicted in FIG. 4a, and moved towards one another for engaging the top of an annular flange F on the bottle neck N—thereby clamping the capped bottle neck Z onto the mounting post 211, as depicted in FIG. 4b.

The fixture 200 preferably includes a safety feature that prevents pressurization of the first compartment $209^1$ unless a capped bottle neck Z mounted onto the mounting post 211 is clamped down, and prevents unclamping of a capped bottle neck Z clamped onto the mounting post 211 when the first compartment $209^1$ is pressurized. An elegant system for reliably providing this safety feature is depicted in FIG. 6. The depicted system prevents pressurization of and releases pressure from the first compartment $209^1$ any time the cover 220 is not sealingly engaging the tray 210 by providing venting channels 216v in the tray 210 that are in fluid communication with the test gas passageway 216 for venting test gas into the atmosphere and are sealed off by the cover 220 that sealingly engages o-rings 232 that encircle the outlet (unnumbered) of the venting channels 216v between the tray 210 and the cover 220 when the cover 220 is fitted and compressed onto the tray 210. The depicted system also prevents the cover 220 from sealingly engaging the tray 210 unless and until a capped bottle neck Z mounted onto the mounting post 211 is clamped down onto the mounting post 211 by providing an axially extending ring fitting 221 on the lower end of the cover 220 that is configured and arranged to extend into the well 219 in the tray 210, such that fitted engagement of the cover 220 onto the tray 210 is obstructed by contact between the fitting 221 and the clips 260 when the clips are in the open position (i.e., moved away from one another), but is unhindered when the clips 260 are in the closed or clamping position (i.e., moved towards each other).

Referring to FIGS. 3 and 6, a first passageway 216 with diametrically opposed inlet 216i and outlet 216o orifices is provided in the tray 210 for allowing target-analyte-containing test gas from a source of test gas 110 to be introduced under pressure via a supply line 112 into the first compartment $209^1$ during testing.

Referring to FIGS. 3 and 5, a second passageway 217 with diametrically opposed inlet 217i and outlet 217o orifices is provided in the tray 210 for allowing target-analyte-free carrier gas from a source of carrier gas 120 to flow into the second compartment $209^2$ via a supply line 122a and out from the second compartment $209^2$ via an exhaust line 122b for purposes of flushing the second compartment $209^2$ prior to commencement of testing, and conveying the contents of the second compartment $209^2$ into sensing contact with a target-analyte sensor 300 during testing.

Referring to FIGS. 3 and 7, a third passageway 218 with diametrically opposed inlet 218i and outlet 218o orifices is provided in the tray 210 for allowing target-analyte-free flushing gas—preferably from a source of flushing gas 130—to flow into the annular channel 215 in the mounting post 211 via a supply line 132 and vent the contents of the channel 215 into the atmosphere during testing. For some applications, the source of carrier gas 120 and the source of flushing gas 130 can be the same source. Alternatively, for some applications air can be used as the flushing gas so long as air contains only trace quantities of the target-analyte.

The fixture 200 should be constructed from a material that is essentially impervious to target-analyte and does not appreciably absorb, adsorb or emit target-analyte. A preferred material of construction is stainless steel.

Use

The instrument 10 can quickly, accurately and reliably measure the gas transmission rate of a target-analyte (typically $CO_2$) through a capped mouth M of a bottle B.

First, a capped bottle neck Z, sans bottle body, must be obtained. Typically, this can be achieved by simply removing a filled and sealed bottle B from the production line, and severing the capped bottle neck Z from the body of the bottle B. The bottle body and bottle contents can be discarded.

With the control valve 111 for the source of test gas 110, the control valve 121 for the source of carrier gas 120, and the control valve 131 for the source of flushing gas 130 closed, the cover 220 is separated from the base 210, the clips 260 slid outward—away from one another—and the severed capped bottle neck Z press fitted by hand onto the mounting post 211.

The clips 260 are slid inward—towards one another—into clamping engagement with the upper surface of the annular flange F on the mounted bottle neck N. The cover 220 is then fitted onto the base 210 and sealingly compressed against the base 210 by placing the compression beam 240 over the cover 220, securing the ends of the compression beam 240 to the stanchions 212a and 212b below the head of each stanchion 212a and 212b, and then rotating the knob 250 within the threaded orifice 249 in the compression beam 240 until the tip 252t of the shaft 252 engages and compresses the cover 220 down onto the base 210.

Prior to placing the sensor 300 into fluid communication with the fixture 200, the first compartment $209^1$ is flushed with target-analyte-containing test gas (such as 100% $CO_2$) from the source of test gas 110 by opening both the test gas control valve 111 and the test gas venting valve 113, and the second compartment $209^2$ is flushed with target-analyte-free carrier gas (such as 100% $N_2$) from the source of carrier gas 121 by opening both the carrier gas control valve 121 and the carrier gas venting valve 123. When fully flushed, testing can be commenced by closing the test gas venting valve 113 so as to pressurize the first compartment $209^1$ with target-analyte-containing test gas (such as 100% $CO_2$), and closing the carrier gas venting valve 123 so as to direct the flow of carrier gas and thereby the contents of the second compartment $209^2$ into sensing engagement with the target-analyte sensor 300. Optionally, the annular channel 215 in the mounting post 211 can be flushed with target-analyte-free flushing gas from the source of flushing gas 130 by opening flushing gas control valve 131 as desired.

Timed detection of target-analyte in the second compartment $209^2$ correlates to the transmission rate of target-analyte through the capped bottle neck Z as the only statistically significant paths available for introducing target-analyte into the second compartment 209[2] is via permeation through the cap C on the capped bottle neck Z or leakage through the seal formed between the cap C and the bottle neck N on the capped bottle neck Z.

When testing is completed, the control valve 111 for the source of test gas 110, the control valve 121 for the source of carrier gas 120, and the control valve 131 for the source of flushing gas 130 are closed, followed by opening of the venting valve 113 for the source of test gas 110, the venting valve 123 for the source of carrier gas 120, and the venting valve 133 for the source of flushing gas 130 to release any pressure from within the fixture 200. The knob 250 can then be rotated to release clamping pressure on the cover 220, the cover 220 separated from the base 210, the clips 260 slid outward—away from one another—and the mounted capped bottle neck Z removed from the mounting post 211.

We claim:

1. A fixture for use in testing gas transmission rates through a capped mouth of a bottle, comprising:

(a) a selectively openable and closeable enclosure defining a chamber, (b) a post extending into the chamber configured and arranged to sealingly engage an inner surface of a capped bottle neck, wherein mounting of a capped bottle neck onto the post sealingly separates the chamber into a first compartment inside the mounted capped bottle neck and a second compartment outside the mounted capped bottle neck, and (c) a passage through the post configured and arranged for introducing a pressurized fluid into the first compartment.

2. The fixture of claim 1 further comprising a vent in fluid communication with the passage, wherein the vent is open to atmospheric venting when the enclosure is open and closed to atmospheric venting when the enclosure is closed.

3. The fixture of claim 2 further comprising a clamp selectively positionable between (i) an open position permitting mounting of a capped bottle neck onto the post and preventing sealing of the enclosure, and (ii) a closed position securing a capped bottle neck onto the post and permitting sealing of the enclosure.

4. The fixture of claim 1 further comprising a clamp for securing a capped bottle neck sans bottle body onto the post.

5. The fixture of claim 4 wherein the clamp engages an annular flange on a capped bottle neck mounted onto the post.

6. The fixture of claim 1 wherein (i) the post has at least two axially-spaced annular rings, each operable for sealingly engaging an inner surface of a capped bottle neck, and (ii) the post further includes a vented annular channel axially positioned intermediate the annular rings in fluid communication with a source of flushing gas.

7. An analytical instrument for measuring gas transmission rate of a target-analyte through a capped mouth of a bottle, comprising:

(a) the fixture of claim 1, (b) a source of pressurized gas containing a target-analyte in fluid communication with the first compartment via the passage through the post, and (c) a target-analyte sensor in communication with the second compartment for detecting target-analyte in the second compartment.

8. The analytical instrument of claim 7 wherein (i) the post has at least two axially spaced annular rings each operable for sealingly engaging an inner surface of a capped bottle neck, (ii) the post further includes a vented annular channel axially positioned intermediate the annular rings, and (iii) the instrument further includes a source of flushing gas in fluid communication with the annular channel.

9. The analytical instrument of claim 8 wherein the flushing gas contains is essentially 100% $N_2$.

10. The analytical instrument of claim 8 wherein the flushing gas is air.

11. A method of measuring gas transmission rate of a target-analyte through a capped mouth of a bottle, comprising:

(a) obtaining the analytical instrument of claim 8, (b) obtaining a capped neck portion of a bottle sans at least a bottom portion of a bottle body, (c) mounting the capped bottle neck onto the post so as to form the first compartment, (d) closing the enclosure so as to seal the mounted capped bottle neck within the chamber and form the second compartment, (e) flushing the second compartment to remove target-anlayte from the second compartment, (f) introducing pressurized gas containing target-analyte into the first compartment via the passage through the post, (g) flushing the annular channel in the post with an analyte-free flushing gas, and (h) detecting and measuring target-analyte passing from the first compartment into the second compartment through the mounted capped bottle neck.

12. The method of claim 11 further comprising the step of severing a neck portion of a capped bottle from a majority of a body portion of the bottle prior to mounting of the capped bottle neck onto the post.

13. The method of claim 11 further comprising the step of calculating a transmission rate of target-analyte passing from the first compartment into the second compartment through the mounted capped bottle neck.

14. The method of claim 11 wherein the target-analyte is $CO_2$.

15. The analytical instrument of claim 7 wherein the fixture further comprises a clamp for securing a capped bottle neck sans bottle body onto the post against an expelling force exerted by pressurized fluid introduced into the first compartment.

16. A method of measuring gas transmission rate of a target-analyte through a capped mouth of a bottle, comprising:

(a) obtaining the analytical instrument of claim 15, (b) obtaining a capped bottle having a neck portion and a body portion, (c) severing the neck portion of the bottle from a majority of the body portion of the bottle, (d) mounting the severed capped bottle neck onto the post so as to form the first compartment, (e) clamping the mounted capped bottle neck down onto the post, (f) closing the enclosure so as to seal the entire mounted capped bottle neck within the chamber and form the second compartment, (g) flushing the second compartment to remove target-anlayte from the second compartment, (h) introducing pressurized gas containing target-analyte into the first compartment via the passage through the post, and (i) detecting and measuring target-analyte passing from the first compartment into the second compartment through the mounted capped bottle neck.

17. The method of claim 16 further comprising the step of calculating a transmission rate of target-analyte passing from the first compartment into the second compartment through the mounted capped bottle neck.

18. The method of claim 16 wherein the target-analyte is $CO_2$.

19. The analytical instrument of claim 7 wherein the target-analyte is $CO_2$.

20. The analytical instrument of claim 19 wherein the source of pressurized gas containing target-analyte contains a known concentration of $CO_2$.

21. The analytical instrument of claim 7 wherein the target-analyte sensor is a $CO_2$ sensor.

22. The analytical instrument of claim 21 wherein the $CO_2$ sensor is an infra red $CO_2$ sensor.

23. A method of measuring gas transmission rate of a target-analyte through a capped mouth of a bottle, comprising:
- (a) obtaining the analytical instrument of claim 7,
- (b) obtaining a capped neck portion of a bottle,
- (c) mounting the capped bottle neck onto the post so as to form the first compartment,
- (d) closing the enclosure so as to seal the entire mounted capped bottle neck within the chamber and form the second compartment,
- (e) flushing the second compartment to remove target-anlayte from the second compartment,
- (f) introducing pressurized gas containing target-analyte into the first compartment via the passage through the post, and
- (g) detecting and measuring target-analyte passing from the first compartment into the second compartment through the mounted capped bottle neck.

24. The method of claim 23 further comprising the step of severing a neck portion of a capped bottle from a bulk of a body portion of the bottle to obtain a capped neck portion of a bottle sans bottle body.

25. The method of claim 24 wherein the target-analyte is $CO_2$.

26. The method of claim 25 wherein the source of pressurized gas containing target-analyte contains a known concentration of $CO_2$.

27. The method of claim 23 further comprising the step of calculating a transmission rate of target-analyte passing from the first compartment into the second compartment through the mounted capped bottle neck.

* * * * *